(12) United States Patent
Song et al.

(10) Patent No.: US 12,064,884 B2
(45) Date of Patent: Aug. 20, 2024

(54) AUTOMATED CALIBRATION SYSTEM AND CALIBRATION METHOD FOR FLEXIBLE ROBOT ACTUATOR

(71) Applicant: SOUTHEAST UNIVERSITY, Nanjing (CN)

(72) Inventors: Aiguo Song, Nanjing (CN); Jianwei Lai, Nanjing (CN); Huijun Li, Nanjing (CN); Hong Zeng, Nanjing (CN); Baoguo Xu, Nanjing (CN)

(73) Assignee: SOUTHEAST UNIVERSITY, Nanjing (CN)

( * ) Notice: Subject to any disclaimer, the term of this patent is extended or adjusted under 35 U.S.C. 154(b) by 323 days.

(21) Appl. No.: 17/774,317

(22) PCT Filed: Jan. 6, 2022

(86) PCT No.: PCT/CN2022/070409
§ 371 (c)(1),
(2) Date: May 4, 2022

(87) PCT Pub. No.: WO2022/166514
PCT Pub. Date: Aug. 11, 2022

(65) Prior Publication Data
US 2023/0211504 A1    Jul. 6, 2023

(30) Foreign Application Priority Data

Feb. 4, 2021   (CN) .......................... 202110155682.3

(51) Int. Cl.
*B25J 9/16*    (2006.01)
(52) U.S. Cl.
CPC .................................. *B25J 9/1692* (2013.01)

(58) Field of Classification Search
CPC ........ B25J 9/1692; B25J 19/02; B25J 9/1653; B25J 19/04; F15B 19/002; F15B 15/103; G05B 2219/39462
See application file for complete search history.

(56) References Cited

U.S. PATENT DOCUMENTS

| 2007/0156019 A1* | 7/2007 | Larkin ................... A61B 34/30 600/104 |
| 2009/0240372 A1* | 9/2009 | Bordyn .................. B25J 9/1692 901/14 |
| 2019/0257326 A1* | 8/2019 | Ahlquist ................ F15B 15/103 |

FOREIGN PATENT DOCUMENTS

| CN | 101281073 A | 10/2008 |
| CN | 109227538 A | 1/2019 |

(Continued)

*Primary Examiner* — Jaime Figueroa
*Assistant Examiner* — Sihar A Karwan
(74) *Attorney, Agent, or Firm* — MUNCY, GEISSLER, OLDS & LOWE, PC (57) ABSTRACT

The present disclosure discloses an automated calibration system and calibration method for a flexible robot actuator. The calibration system includes a support frame. A visual positioning system, a pressure measuring system and a pneumatic pressure control system are respectively installed on the support frame. The visual positioning system is configured to measure a relative displacement and an angle between two ends of the flexible actuator. The pneumatic pressure control system is configured to charge air into an actuating end of the flexible actuator and measure an input pneumatic pressure of the flexible actuator. The pressure measuring system includes a pressure gauge installed on the support frame through a vertical axis motor system, and the flexible actuator to be calibrated installed on the support frame through a horizontal axis motor system and a rotating motor system. The rotating motor system is installed on the support frame through the horizontal axis motor system, the (Continued)

actuating end of the flexible actuator is fixed on the rotating motor system, and a free end of the flexible actuator is in contact with a measuring end of the pressure gauge to carry out pressure measurement. The calibration system is high in accuracy and simple to use.

10 Claims, 13 Drawing Sheets

(56) References Cited

FOREIGN PATENT DOCUMENTS

| | | | |
|---|---|---|---|
| CN | 110274569 A | | 9/2019 |
| CN | 110788884 A | | 2/2020 |
| CN | 110842907 A | | 2/2020 |
| CN | 112976060 A | | 6/2021 |
| KR | 20200086954 A | * | 7/2020 |

* cited by examiner

AUTOMATED CALIBRATION SYSTEM AND CALIBRATION METHOD FOR FLEXIBLE ROBOT ACTUATOR

TECHNICAL FIELD

The present disclosure relates to an automated calibration system and calibration method for a flexible robot actuator, belonging to the technical field of robot calibration.

BACKGROUND

In the field of robots, soft actuators, a new type of actuators, have the advantages of high flexibility and simple actuation, and are widely used in the fields of robot grippers, rehabilitation therapy and bio-robots. Before using the soft actuator, it is necessary to calibrate its output characteristics, obtain the corresponding relationship between its input and output, and determine the static indicators (maximum output force, maximum bending angle) and dynamic indicators (force response curve, displacement response curve) of the actuator.

At present, the common calibration methods are:

Output displacement-based calibration: one end of the actuator is fixed; an output signal is intensified; a displacement difference and an angle difference between the other end and the initial position are measured; and the relationship between the input pneumatic pressure and the output displacement and rotation angle is obtained.

Maximum force-based calibration: one end of the flexible actuator is fixed; a baffle plate is placed in the opposite direction of the output of the actuator; a force sensor is placed at the other end of the actuator; an input signal is gradually increased from zero; a signal of the sensor is detected; and the relationship between the input pneumatic pressure and the output force is obtained.

These methods may have big errors because of manual operation, and different calibration methods may obtain inconsistent data which are difficult to compare uniformly and thus can only obtain part of output properties.

In an automated calibration system, after an algorithm for automated calibration is designed, an instruction for calibration is input by a person, and the system automatically completes the calibration.

SUMMARY

An objective of the present disclosure is to provide an automated calibration system and calibration method for a flexible robot actuator that are high in accuracy and simple to use, so as to overcome the defects in the prior art.

In order to achieve the technical objective above, the present disclosure adopts the following technical solutions:

An automated calibration system for a flexible robot actuator is provided, which includes a support frame. A visual positioning system, a pressure measuring system and a pneumatic pressure control system are respectively installed on the support frame.

The visual positioning system is configured to measure a relative displacement and an angle between two ends of the flexible actuator.

The pneumatic pressure control system is configured to charge air into an actuating end of the flexible actuator and measure an input pneumatic pressure of the flexible actuator.

The pressure measuring system includes a pressure gauge installed on the support frame through a vertical axis motor system, and the flexible actuator to be calibrated installed on the support frame through a horizontal axis motor system and a rotating motor system. The rotating motor system is installed on the support frame through the horizontal axis motor system. The actuating end of the flexible actuator is fixed on the rotating motor system, and a free end of the flexible actuator is in contact with a measuring end of the pressure gauge to carry out pressure measurement.

The automated calibration system for a flexible robot actuator further includes a personal computer for input of instructions, calculation and output of motor position, camera data processing and data recording.

According to the automated calibration system for a flexible robot actuator, the visual positioning system includes two camera systems installed at two ends of an upper part of the support frame, and a marking point set on the flexible actuator to be calibrated.

According to the automated calibration system for a flexible robot actuator, the pneumatic pressure control system includes an air supply system, an air supply duct for connection with the actuating end of the flexible actuator, and a pneumatic pressure gauge installed on the air supply duct.

According to the automated calibration system for a flexible robot actuator, each of the camera systems includes a camera holder connected with the support frame, and the camera holder is connected with a camera body through a camera rotary joint.

According to the automated calibration system for a flexible robot actuator, the vertical axis motor system includes two vertical axis motor holders for connection with upper and lower ends of the support frame, two vertical axis motor guide rails and one vertical axis motor lead screw are connected between the two vertical axis motor holders, the vertical axis motor lead screw is connected with a power output end of a vertical axis motor through a vertical axis coupling, a vertical axis motor slider is installed on the vertical axis motor lead screw and the vertical axis motor guide rails, and the pressure gauge is installed on the vertical axis motor slider.

According to the automated calibration system for a flexible robot actuator, the horizontal axis motor system includes two horizontal axis motor holders for connection with the support frame, two horizontal axis motor guide rails and one horizontal axis motor lead screw are connected between the two horizontal axis motor holders, the horizontal axis motor lead screw is connected with a power output end of a horizontal axis motor through a horizontal axis motor coupling, a horizontal axis motor slider is installed on the horizontal axis motor lead screw and the horizontal axis motor guide rails, and the rotating motor system is installed on the horizontal axis motor slider.

According to the automated calibration system for a flexible robot actuator, the rotating motor system includes a rotating motor holder connected with the horizontal axis motor slider, a rotating motor is installed on the rotating motor holder, and a flexible actuator bracket for fixing the flexible actuator is installed on the rotating motor.

According to the automated calibration system for a flexible robot actuator, the support frame includes a bottom beam and bottom legs located at two ends of the bottom beam, the bottom beam is provided with three columns, two of the columns are configured to install the horizontal axis motor system, the other column is configured to install the pneumatic pressure gauge, a top beam is disposed at tops of the three columns, the vertical axis motor system is disposed between the bottom beam and the top beam, and two support profiles for installing the camera systems are disposed at two ends of the top beam.

An automated calibration method for a flexible robot actuator by using the automated calibration system for a flexible robot actuator is provided, the method includes:

A: calibration of input pneumatic pressure and output displacement: fixing an actuating end of the flexible actuator to a flexible actuator bracket, controlling a value of pneumatic pressure in the flexible actuator to increase from zero to a maximum pneumatic pressure value with a step of a minimum calibration unit by a pneumatic pressure control system, collecting images under different pneumatic pressures by camera systems, calculating to obtain displacements and angles of the actuator under different pneumatic pressures, and recording specific values of data; and B: calibration of output force of input pneumatic pressure at different bending angles: obtaining output displacements and angles of the flexible actuator under different pneumatic pressures according to step A, then adjusting a horizontal axis motor system, a vertical axis motor system and a rotating motor system to make a measuring end of a pressure gauge, that is, a force bearing point of the pressure gauge in contact with a perpendicular point of a free end of the flexible actuator; and carrying out specific numerical analysis for movement as follows:

set a point of intersection of a horizontal axis motor and a vertical axis motor be the origin of coordinate axes, an axis of the horizontal axis motor system be the X-axis, an axis of the vertical axis motor system be the Y-axis, A be a midpoint of a line segment of an end portion at an actuating end of the flexible actuator and B be a midpoint of a line segment of an end portion at a free end of the flexible actuator, points A and B are connected to form a line segment $L_{AB}$ an included angle between the line segment $L_{AB}$ and the X-axis is $\theta$, a perpendicular to the line segment of the end portion at the actuating end of the flexible actuator is made through the point B with a point O as the foot; let $Y=L_{BO}$, $X=L_{AO}$, an auxiliary line $L_{AF}$ parallel to the Y-axis is made through the point A, an auxiliary line $L_{BE}$ parallel to the vertical axis is made through the point B, an auxiliary line $L_{AD}$ perpendicular to $L_{AO}$ is made through the point A, and a perpendicular $L_{BO}$ to a fixed end of the flexible actuator is made through the point B:

when $\theta=0$, the pressure gauge is just at a tail end of the actuator, and in this case, a coordinate output of the X-axis motor is $-Y1$, a coordinate output of the Y-axis motor is 0, and an output of a Z-axis motor is 0;

when $\theta>0$, as the rotating motor rotates counterclockwise by the angle $\theta$, the tail end of the actuator is perpendicular to a force bearing end of the pressure gauge, and the following formulae are obtained through analysis:

$$L_{AB} = \sqrt{(X^2 + Y^2)},$$

$$\angle_{DAE} = \frac{\pi}{2} - \theta,$$

$$\angle_{EAO} = \theta,$$

$$\angle_{BAE} = \alpha - \angle_{EAO},$$

where $$\alpha = \angle_{BAO} = \arctan\left(\frac{Y}{X}\right),$$

the following formulae are obtained:

$$L_{BE} = \sin\angle_{BAE} * L_{AB},$$

$$L_{AE} = \cos\angle_{BAE} * L_{AB}$$

in this case, the coordinate output of the X-axis motor is $-L_{AE}$, the coordinate output of the Y-axis motor is $L_{BE}$, thus the outputs of the three motor axes of each (X, Y, $\theta$) point are obtained based on the displacements and angles of the actuator under different pneumatic pressures obtained in step A, the value of pneumatic pressure in the flexible actuator is controlled to increase from zero to the maximum pneumatic pressure value with the step of the minimum calibration unit by the pneumatic pressure control system, and data of the pressure gauge is recorded, thereby completing the calibration.

Beneficial Effects

1. The automated calibration system is used as the calibration system, has high work efficiency, and can save labor costs and reduce calibration errors caused by human factors.

2. This calibration system can calibrate not only the relationship between the input pneumatic pressure and the output displacement and output angle, but also the response relationship of different relative displacements and relative coordinates, and is simple to operate and high in calibration accuracy.

In the figures: 1, support frame; 11, bottom beam; 12, bottom leg; 13, three columns; 14, top beam; 15, support profile; 2; visual positioning system; 21, camera system; 211, camera holder; 212, camera rotary joint; 213, camera body; 3, pressure measuring system; 31, vertical axis motor system; 311, vertical axis motor holder; 312, vertical axis motor guide rail; 313, vertical axis motor lead screw; 314, vertical axis coupling; 315, vertical axis motor; 316, vertical axis motor slider; 32, pressure gauge; 33, horizontal axis motor system; 331, horizontal axis motor holder; 332, horizontal axis motor guide rail; 333, horizontal axis motor lead screw; 334, horizontal axis motor coupling; 335, horizontal axis motor; 336, horizontal axis motor slider; 34, rotating motor system; 341, rotating motor holder; 342, rotating motor; 343, flexible actuator bracket; 4, pneumatic pressure control system; 41, air supply system; 42, air supply duct; 43, pneumatic pressure gauge; 5, flexible actuator; 51, actuating end of flexible actuator; 52, free end of flexible actuator; 53, marking point; 6, personal computer.

DETAILED DESCRIPTION

The technical solutions of the present disclosure are further described below with reference to the accompanying drawings, but implementations of the present disclosure are not limited thereto.

As shown in FIGS. 1-7, an automated calibration system for a flexible robot actuator is provided, which includes a support frame 1. A visual positioning system 2, a pressure measuring system 3 and a pneumatic pressure control system 4 are respectively installed on the support frame.

Figure 1:
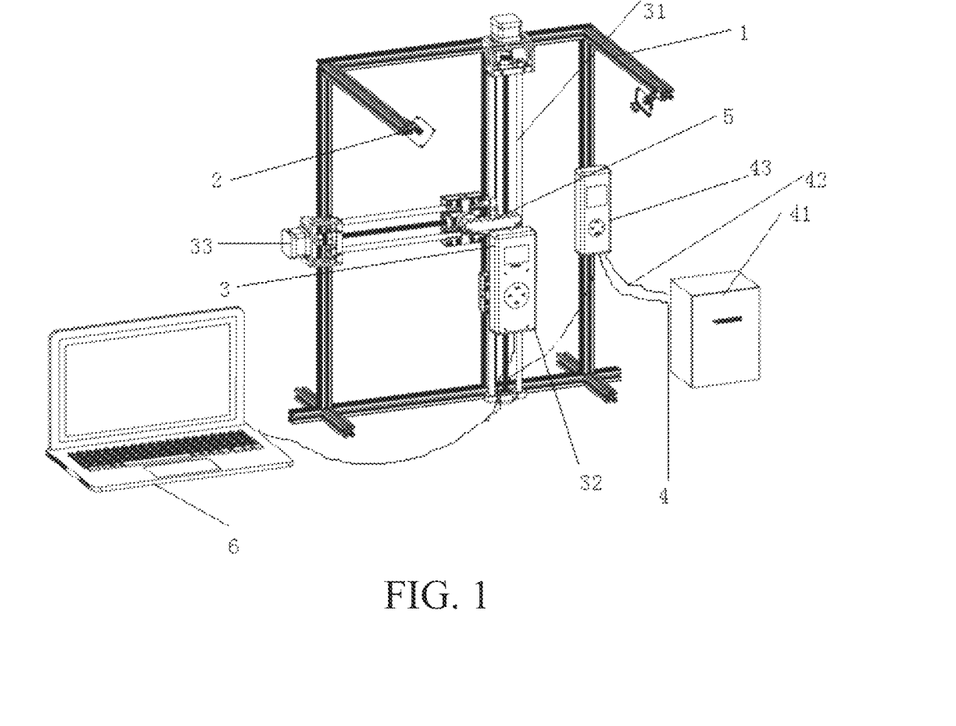
FIG. 1 is a schematic structural diagram of an automated calibration system for a flexible robot actuator according to the present disclosure.

The visual positioning system is configured to measure a relative displacement and an angle between two ends of a flexible actuator 5.

The pneumatic pressure control system is configured to charge air into an actuating end of the flexible actuator 5 and measure an input pneumatic pressure of the flexible actuator.

The pressure measuring system includes a pressure gauge 32 installed on the support frame 1 through a vertical axis motor system 31, and the flexible actuator 5 to be calibrated installed on the support frame 1 through a horizontal axis motor system 33 and a rotating motor system 34. The rotating motor system 34 is installed on the support frame through the horizontal axis motor system 33, the actuating end 51 of the flexible actuator 5 is fixed on the rotating motor system, and a free end 52 of the flexible actuator is in contact with a measuring end of the pressure gauge 32 to carry out pressure measurement.

The automated calibration system for a flexible robot actuator further includes a personal computer 6 for input of instructions, calculation and output of motor position, camera data processing and data recording.

According to the automated calibration system for a flexible robot actuator, the visual positioning system 2 includes two camera systems 21 installed at two ends of an upper part of the support frame, and a marking point 53 set on the flexible actuator to be calibrated.

According to the automated calibration system for a flexible robot actuator, the pneumatic pressure control system 4 includes an air supply system 41, an air supply duct 42 for connection with the actuating end of the flexible actuator, and a pneumatic pressure gauge 43 installed on the air supply duct.

Figure 7:
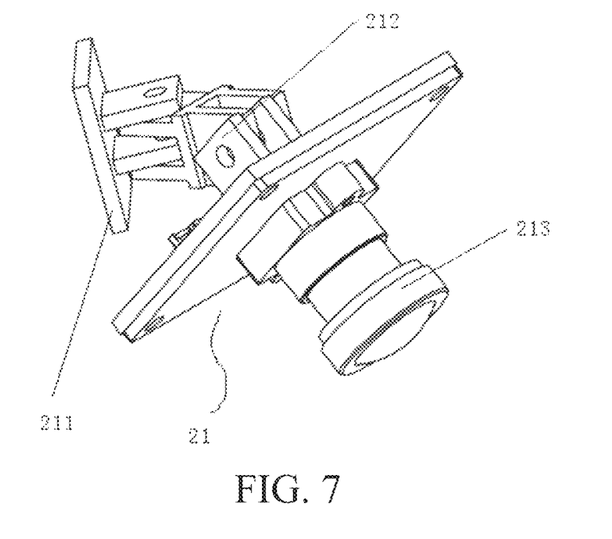
FIG. 7 is a schematic structural diagram of a camera system in FIG. 1.
Figure 8:
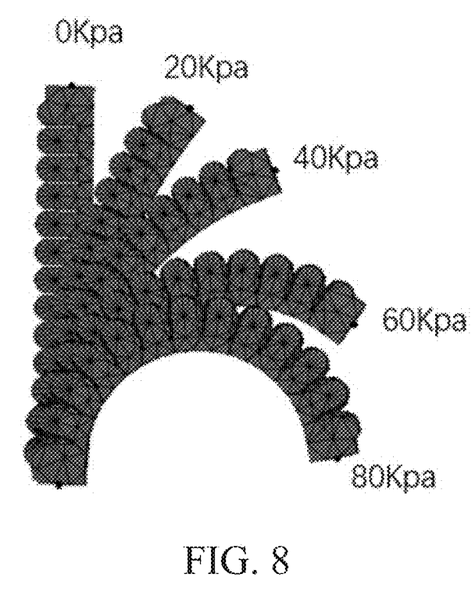
FIG. 8 is a schematic diagram of the flexible actuator bending under different pressures.
Figure 9:
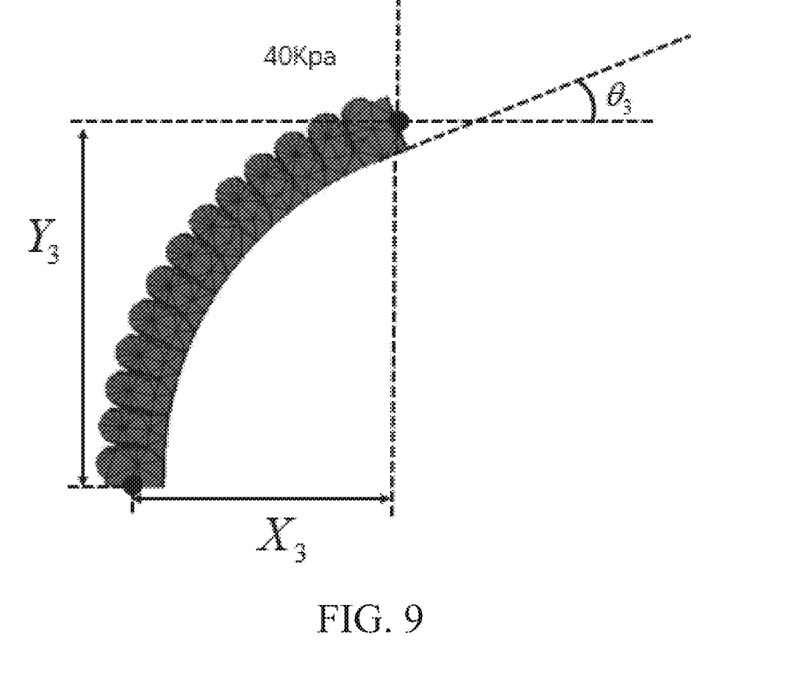
FIG. 9 is a schematic diagram showing measurement of the flexible actuator in coordinates (X3,Y3)

According to the automated calibration system for a flexible robot actuator, each of the camera systems 21 includes a camera holder 211 connected with the support frame, and the camera holder is connected with a camera body 213 through a camera rotary joint 212.

Figure 2:
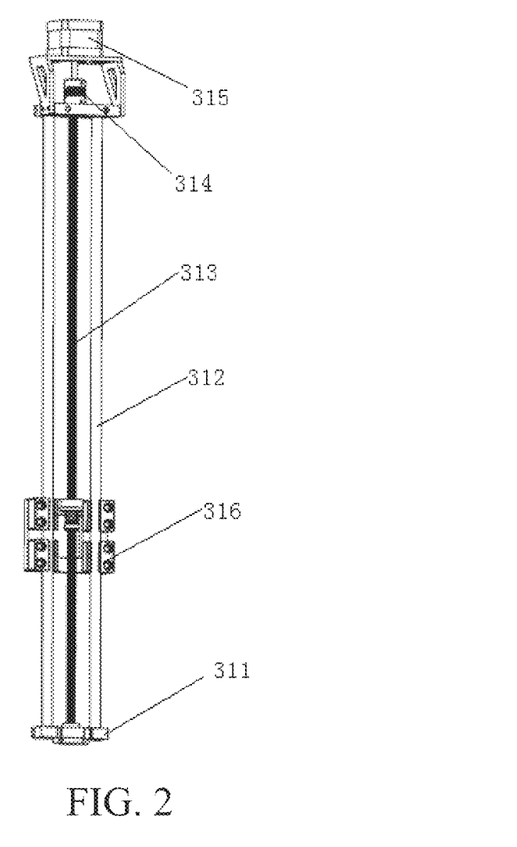
FIG. 2 a schematic structural diagram of a vertical axis motor system in FIG. 1.

According, to the automated calibration system for a flexible robot actuator, the vertical axis motor system 31 includes two vertical axis motor holders 311 for connection with upper and lower ends of the support frame, two vertical axis motor guide rails 312 and one vertical axis motor lead screw 313 are connected between the two vertical axis motor holders, the vertical axis motor lead screw is connected with a power output end of a vertical axis motor 315 through a vertical axis coupling 314, a vertical axis motor slider 316 is installed on the vertical axis motor lead screw and the vertical axis motor guide rails, and the pressure gauge is installed on the vertical axis motor slider.

Figure 4:
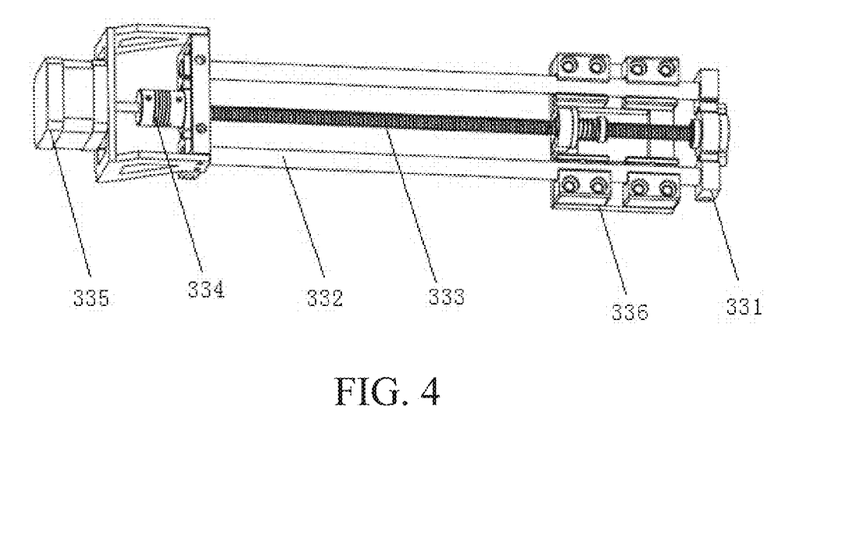
FIG. 4 is a schematic structural diagram of a horizontal axis motor system in FIG. 1.
Figure 5:
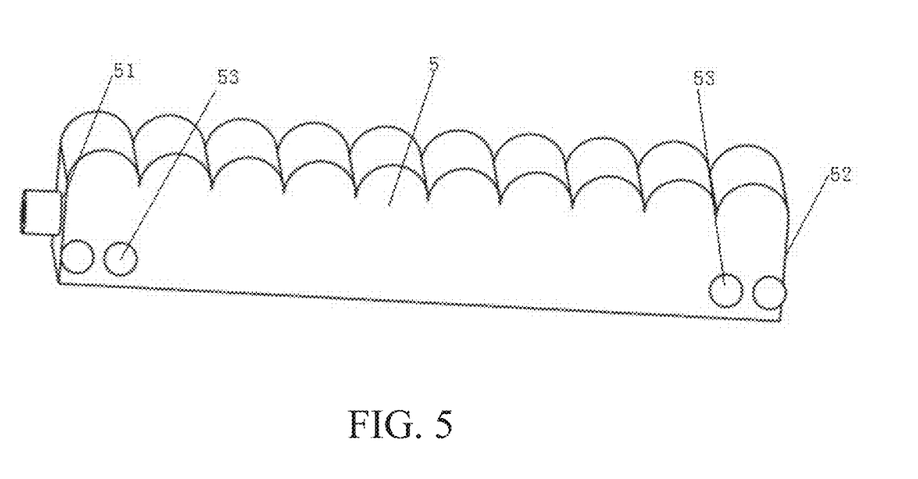
FIG. 5 is a schematic structural diagram of an exemplary flexible actuator in FIG. 1.

According to the automated calibration system for a flexible robot actuator, the horizontal axis motor system 33 includes two horizontal axis motor holders 331 for connection with the support frame, two horizontal axis motor guide rails 332 and one horizontal axis motor lead screw 333 are connected between the two horizontal axis motor holders, the horizontal axis motor lead screw is connected with a power output end of a horizontal axis motor 335 through a horizontal axis motor coupling 334, a horizontal axis motor slider 336 is installed on the horizontal axis motor lead screw and the horizontal axis motor guide rails, and the rotating motor system is installed on the horizontal axis motor slider.

Figure 6:
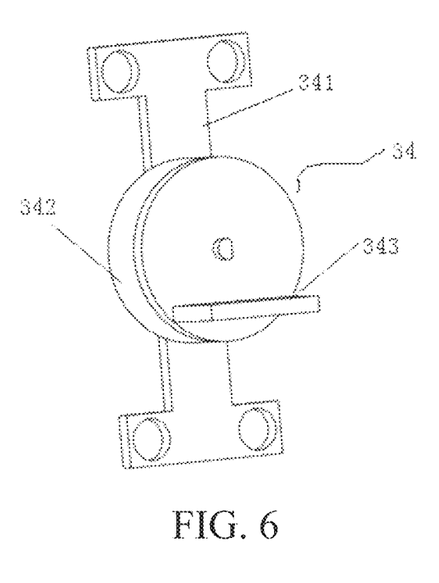
FIG. 6 is a schematic structural diagram of a rotating motor in FIG. 1.

According to the automated calibration system for a flexible robot actuator, the rotating motor system 34 includes a rotating motor holder 341 connected with the horizontal axis motor slider, a rotating motor 342 is installed on the rotating motor holder, and a flexible actuator bracket 343 for fixing the flexible actuator is installed on the rotating motor.

Figure 3:
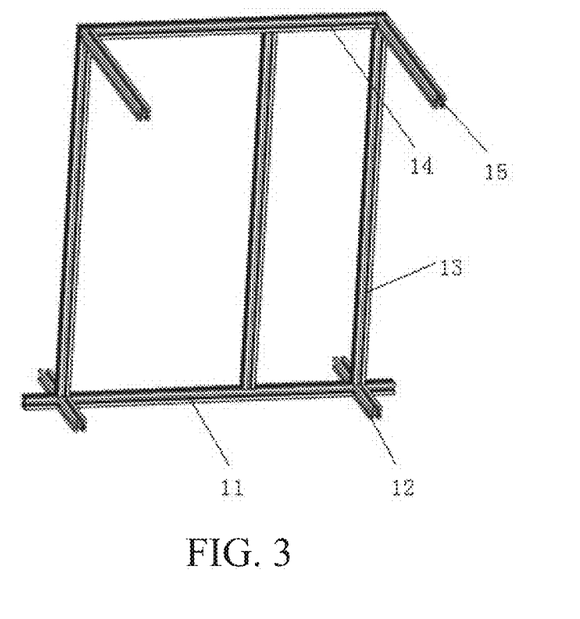
FIG. 3 is a schematic structural diagram of a support frame in FIG. 1.

According to the automated calibration system for a flexible robot actuator, the support frame 1 includes a bottom beam 11 and bottom legs 12 located at two ends of the bottom beam, the bottom beam is provided with three columns 13, two of the columns are configured to install the horizontal axis motor system, the other column is configured to install the pneumatic pressure gauge, a top beam 14 is disposed at tops of the three columns, the vertical axis motor system is disposed between the bottom beam and the top beam, and two support profiles 15 for installing the camera systems are disposed at two ends of the top beam.

An automated calibration method for a flexible robot actuator by using the automated calibration system for a flexible robot actuator is provided, the method includes:

A: Calibration of input pneumatic pressure and output displacement: an actuating end of the flexible actuator is fixed to a flexible actuator bracket, a value of pneumatic pressure in the flexible actuator is controlled to increase from zero to a maximum pneumatic pressure value with a step of a minimum calibration unit by a pneumatic pressure control system, images under different pneumatic pressures are collected by camera systems, displacements and angles of the actuator under different pneumatic pressures are calculated, and specific values of data are recorded. The information is recorded in Table 1.

TABLE 1

| | Pneumatic pressure (KPa) | | | | | | |
|---|---|---|---|---|---|---|---|
| | 0 | 20 | 40 | 60 | 80 | 100 | ... |
| X (mm) | X1 | X2 | X3 | X4 | X5 | X6 | ... |
| Y (mm) | Y1 | Y2 | Y3 | Y4 | Y5 | Y6 | ... |
| θ (°) | θ$_1$ | θ$_2$ | θ$_3$ | θ$_4$ | θ$_5$ | θ$_6$ | ... |

Figure 10:
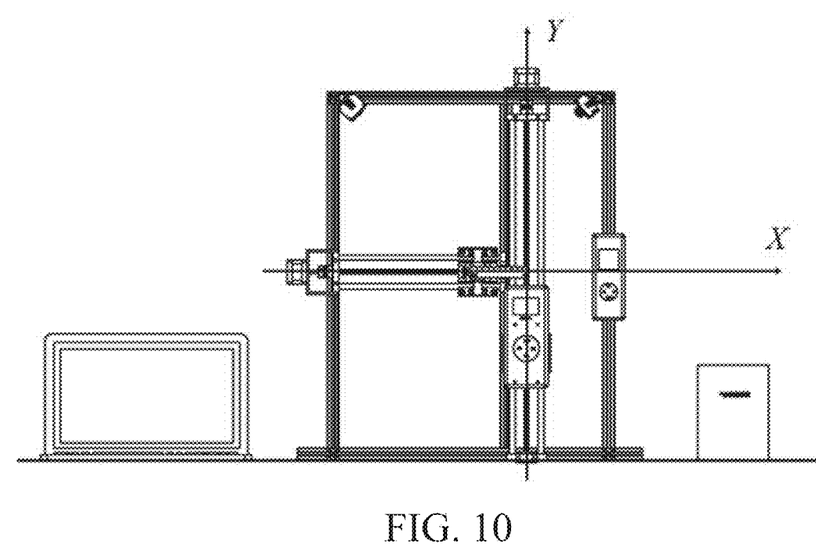
FIG. 10 is a schematic diagram showing coordinates of a measuring position and the origin of the flexible actuator in coordinates (X1,Y1)

B: Calibration of output force of input pneumatic pressure at different bending angles: output displacements and angles of the flexible actuator under different pneumatic pressures are obtained according to step A, then a horizontal axis motor system, a vertical axis motor system and a rotating motor system are adjusted to make a measuring end of a pressure gauge, that is, a force bearing point of the pressure gauge in contact with a perpendicular point of a free end of the flexible actuator, and specific numerical analysis for movement is carried out as follows: the origin of coordinate axes is set as shown in FIG. 10.

Figure 11:
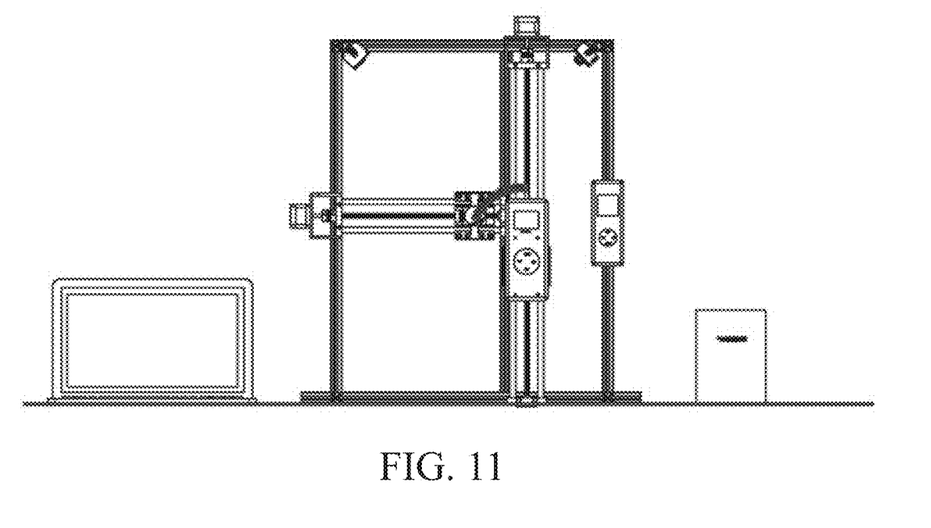
FIG. 11 is a schematic diagram showing coordinates of a measuring position of the flexible actuator in coordinates (X,Y)
Figure 12:
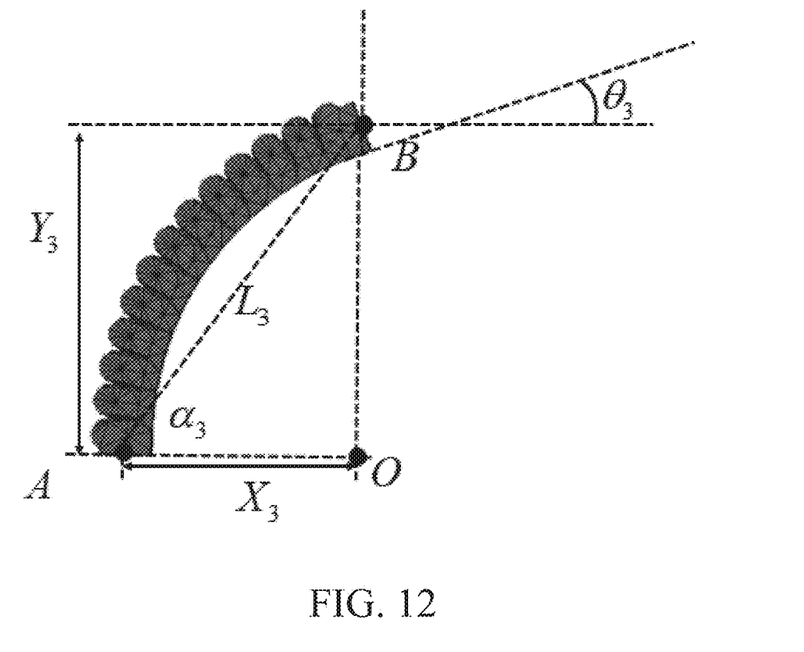
FIG. 12 is a schematic diagram showing analysis of a simplified model of the bent flexible actuator.
Figure 13:
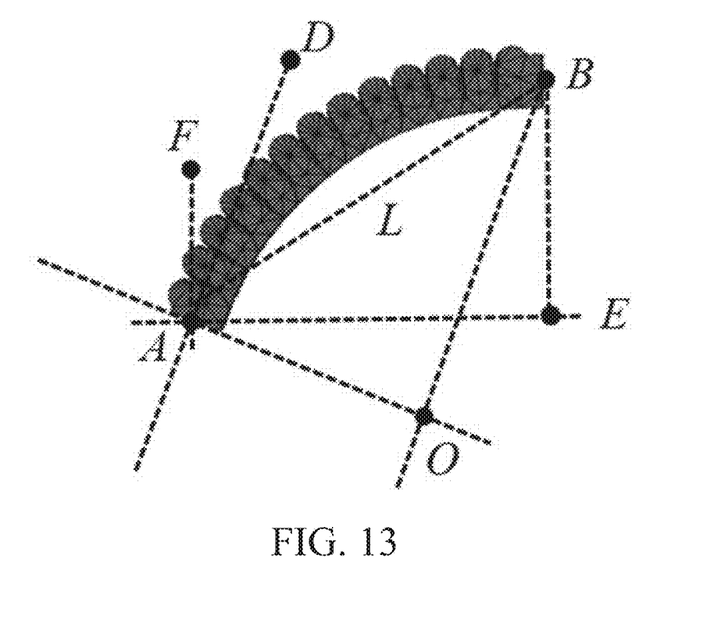
FIG. 13 is a schematic diagram showing analysis of a model of the bent flexible actuator after movement of three motor axes.

A point of intersection of a horizontal axis motor and a vertical axis motor is set to be the origin of coordinate axes, an axis of the horizontal axis motor system is set to be the X-axis, an axis of the vertical axis motor system is set to be the Y-axis, A is set to be a midpoint of a line segment of an end portion at an actuating end of the flexible actuator and B is set to be a midpoint of a line segment of an end portion at a free end of the flexible actuator, points A and B are connected to form a line segment $L_{AB}$ an included angle between the line segment $L_{AB}$ and the X-axis is θ, a perpendicular to the line segment of the end portion at the actuating end of the flexible actuator is made through the point B with a point O as the foot, let Y=$L_{BO}$, X=$L_{AO}$, an auxiliary line $L_{AF}$ parallel to the Y-axis is made through the point A, an auxiliary line parallel to the vertical axis is made through the point B, an auxiliary line $L_{AD}$ perpendicular to $L_{AO}$ is made through the point A, and a perpendicular $L_{BO}$ to a fixed end of the flexible actuator is made through the point B:

when θ=0, the pressure gauge is just at a tail end of the actuator, and in this case, a coordinate output of the X-axis motor is −Y1, a coordinate output of the Y-axis motor is 0, and an output of a Z-axis motor is 0;

when θ=0, the pressure gauge is just in perpendicular contact with the tail end of the actuator, as shown in FIG. 11, and a simplified model of the bent flexible actuator is shown in FIG. 12; as the rotating motor rotates counterclockwise by the angle θ, the tail end of the actuator is perpendicular to a force bearing end of the pressure gauge, and a simplified model in this case is shown in FIG. 13; the following formulae are obtained through analysis:

$$L_{AB} = \sqrt{(X^2 + Y^2)},$$

$$\angle_{DAE} = \frac{\pi}{2} - \theta,$$

$$\angle_{EAO} = \theta,$$

$$\angle_{BAE} = \alpha - \angle_{EAO},$$

where $$\alpha = \angle_{BAO} = \arctan\left(\frac{Y}{X}\right),$$

the following formulae are obtained:

$$L_{BE} = \sin\angle_{BAE} * L_{AB},$$

$$L_{AE} = \cos\angle_{BAE} * L_{AB}$$

in this case, the coordinate output of the X-axis motor is −$L_{AE}$, the coordinate output of the Y-axis motor is $L_{BE}$, thus the outputs of the three motor axes of each (X,Y, θ) point are obtained based on the displacements and angles of the actuator under different pneumatic pressures obtained in step A, the value of pneumatic pressure in the flexible actuator is controlled to increase from zero to the maximum pneumatic pressure value with the step of the minimum calibration unit by the pneumatic pressure control system, and data of the pressure gauge is recorded, thereby completing the calibration. The data is recorded in Table 2:

TABLE 2

| | Pneumatic pressure (KPa) | | | | | | |
|---|---|---|---|---|---|---|---|
| | 0 | 20 | 40 | 60 | 80 | 100 | ... |
| (X1, Y1, θ$_1$) | 0 | | | | | | ... |
| (X2, Y2, θ$_2$) | 0 | 0 | | | | | ... |
| (X1, Y1, θ$_3$) | 0 | 0 | 0 | | | | ... |
| ... | ... | ... | ... | ... | ... | ... | ... |

What is claimed is:

1. An automated calibration system for a flexible robot actuator, comprising a support frame, wherein a visual positioning system, a pressure measuring system and a pneumatic pressure control system are respectively installed on the support frame;

the visual positioning system is configured to measure a relative displacement and an angle between two ends of the flexible actuator;

the pneumatic pressure control system is configured to charge air into an actuating end of the flexible actuator and measure an input pneumatic pressure of the flexible actuator; and the pressure measuring system comprises a pressure gauge installed on the support frame through a vertical axis motor system, and the flexible actuator to be calibrated installed on the support frame through a horizontal axis motor system and a rotating motor system; and the rotating motor system is installed on the support frame through the horizontal axis motor system, the actuating end of the flexible actuator is fixed on the rotating motor system, and a free end of the flexible actuator is in contact with a measuring end of the pressure gauge to carry out pressure measurement.

2. The automated calibration system for a flexible robot actuator according to claim 1, further comprising a personal computer for input of instructions, calculation and output of motor position, camera data processing and data recording.

3. The automated calibration system for a flexible robot actuator according to claim 1, wherein the visual positioning system comprises two camera systems installed at two ends of an upper part of the support frame, and a marking point set on the flexible actuator to be calibrated.

4. The automated calibration system for a flexible robot actuator according to claim 1, wherein the pneumatic pressure control system comprises an air supply system, an air supply duct for connection with the actuating end of the flexible actuator, and a pneumatic pressure gauge installed on the air supply duct.

5. The automated calibration system for a flexible robot actuator according to claim 3, wherein each of the camera systems comprises a camera holder connected with the support frame, and the camera holder is connected with a camera body through a camera rotary joint.

6. The automated calibration system for a flexible robot actuator according to claim 1, wherein the vertical axis motor system comprises two vertical axis motor holders for connection with upper and lower ends of the support frame, two vertical axis motor guide rails and one vertical axis motor lead screw are connected between the two vertical axis motor holders, the vertical axis motor lead screw is connected with a power output end of a vertical axis motor through a vertical axis coupling, a vertical axis motor slider is installed on the vertical axis motor lead screw and the vertical axis motor guide rails, and the pressure gauge is installed on the vertical axis motor slider.

7. The automated calibration system for a flexible robot actuator according to claim 1, wherein the horizontal axis motor system comprises two horizontal axis motor holders for connection with the support frame, two horizontal axis motor guide rails and one horizontal axis motor lead screw are connected between the two horizontal axis motor holders, the horizontal axis motor lead screw is connected with a power output end of a horizontal axis motor through a horizontal axis motor coupling, a horizontal axis motor slider is installed on the horizontal axis motor lead screw and the horizontal axis motor guide rails, and the rotating motor system is installed on the horizontal axis motor slider.

8. The automated calibration system for a flexible robot actuator according to claim 1, wherein the rotating motor system comprises a rotating motor holder connected with the horizontal axis motor slider, a rotating motor is installed on the rotating motor holder, and a flexible actuator bracket for fixing the flexible actuator is installed on the rotating motor.

9. The automated calibration system for a flexible robot actuator according to claim 1, wherein the support frame comprises a bottom beam and bottom legs located at two ends of the bottom beam, the bottom beam is provided with three columns, two of the columns are configured to install the horizontal axis motor system, the other column is configured to install the pneumatic pressure gauge, a top beam is disposed at tops of the three columns, the vertical axis motor system is disposed between the bottom beam and the top beam, and two support profiles for installing the camera systems are disposed at two ends of the top beam.

10. An automated calibration method for a flexible robot actuator by using the automated calibration system for a flexible robot actuator, wherein the method comprises:
A: calibration of input pneumatic pressure and output displacement: fixing an actuating end of the flexible actuator to a flexible actuator bracket, controlling a value of pneumatic pressure in the flexible actuator to increase from zero to a maximum pneumatic pressure value with a step of a minimum calibration unit by a pneumatic pressure control system, collecting images under different pneumatic pressures by camera systems, calculating to obtain displacements and angles of the actuator under different pneumatic pressures, and recording specific values of data; and
B: calibration of output force of input pneumatic pressure at different bending angles: obtaining output displacements and angles of the flexible actuator under different pneumatic pressures according to step A, then adjusting a horizontal axis motor system, a vertical axis motor system and a rotating motor system to make a measuring end of a pressure gauge, that is, a force bearing point of the pressure gauge in contact with a perpendicular point of a free end of the flexible actuator, and carrying out specific numerical analysis for movement as follows:
set a point of intersection of a horizontal axis motor and a vertical axis motor be the origin of coordinate axes, an axis of the horizontal axis motor system be the X-axis, an axis of the vertical axis motor system be the Y-axis, A be a midpoint of a line segment of an end portion at an actuating end of the flexible actuator and B be a midpoint of a line segment of an end portion at a free end of the flexible actuator, points A and B are connected to form a line segment $L_{AB}$, an included angle between the line segment $L_{AB}$ and the X-axis is θ, a perpendicular to the line segment of the end portion at the actuating end of the flexible actuator is made through the point B with a point O as the foot, let $Y=L_{BO}$, $X=L_{AO}$,
an auxiliary line $L_{AF}$ parallel to the Y-axis is made through the point A, an auxiliary line $L_{BE}$ parallel to the vertical axis is made through the point B,
an auxiliary line $L_{AD}$ perpendicular to $L_{AO}$ is made through the point A, and a perpendicular $L_{BO}$ to a fixed end of the flexible actuator is made through the point B:
wherein when θ=0, the pressure gauge is just at a tail end of the actuator, and in this case, a coordinate output of the X-axis motor is −Y1, a coordinate output of the Y-axis motor is 0, and an output of a Z-axis motor is 0;
when θ>0, as the rotating motor rotates counterclockwise by the angle θ, the tail end of the actuator is perpendicular to a force bearing end of the pressure gauge, and the following formulae are obtained through analysis:

$$L_{AB} = \sqrt{(X^2 + Y^2)},$$

$$L_{DAE} = \frac{\pi}{2} - \theta,$$

$$L_{EAO} = \theta,$$

$$L_{BAE} = \alpha - L_{EAO},$$

wherein $$\alpha = L_{BAO} = \arctan\left(\frac{Y}{X}\right),$$

the following formulae are obtained:

$$L_{BE} = \sin \angle_{BAE} * L_{AB},$$

$$L_{AE} = \cos \angle_{BAE} * L_{AB}$$

in this case, the coordinate output of the X-axis motor is $-L_{AE}$, the coordinate output of the Y-axis motor is $L_{BE}$, thus the outputs of the three motor axes of each (X, Y, θ) point are obtained based on the displacements and angles of the actuator under different pneumatic pressures obtained in step A, the value of pneumatic pressure in the flexible actuator is controlled to increase from zero to the maximum pneumatic pressure value with the step of the minimum calibration unit by the pneumatic pressure control system, and data of the pressure gauge is recorded, thereby completing the calibration.

* * * * *